[11] 3,605,014

[72] Inventor Robert H. McCracken
5120 Newport Ave., Chevy Chase, Md. 20016
[21] Appl. No. 842,478
[22] Filed July 17, 1969
[45] Patented Sept. 14, 1971

[54] PHASE-SAMPLING VOLTMETER
5 Claims, 1 Drawing Fig.
[52] U.S. Cl............................................. 324/102, 324/77 A
[51] Int. Cl....................................................G01r 19/00, G01r 27/28
[50] Field of Search............................................324/102, 77 A, 121; 328/15, 151; 307/235

[56] References Cited
UNITED STATES PATENTS
2,502,955 4/1950 Janssen ........................ 328/15 X
2,591,738 4/1950 Spencer........................ 324/102
2,624,770 1/1953 Yetter............................ 324/102
3,412,331 11/1968 Boatwright et al............. 328/151 X
3,423,628 1/1969 Best.............................. 328/151 X Primary Examiner—Rudolph V. Rolinec
Assistant Examiner—Ernest F. Karlsen
Attorneys—Harry M. Saragovitz, Edward J. Kelly, Herbert Berl and J. D. Edgerton ABSTRACT: A voltmeter is provided which is capable of measuring the amplitude of a recurrent input signal waveform at any selected phase. Zero-crossings of the input signal are used to synchronize a ramp generator and the output thereof is applied as one input to a comparator device. A potentiometer is used to select a fraction of the ramp voltage which is equal to the fraction of the waveform cycle which represents the desired phase. This selected fractional ramp is then peak detected to provide a reference voltage to the other input of the comparator device. When the ramp voltage reaches the desired fractional voltage, the comparator device will emit a pulse which in turn will enable a sampling gate which allows a sample of the input signal at the selected phase to be stored.

PATENTED SEP 14 1971
3,605,014
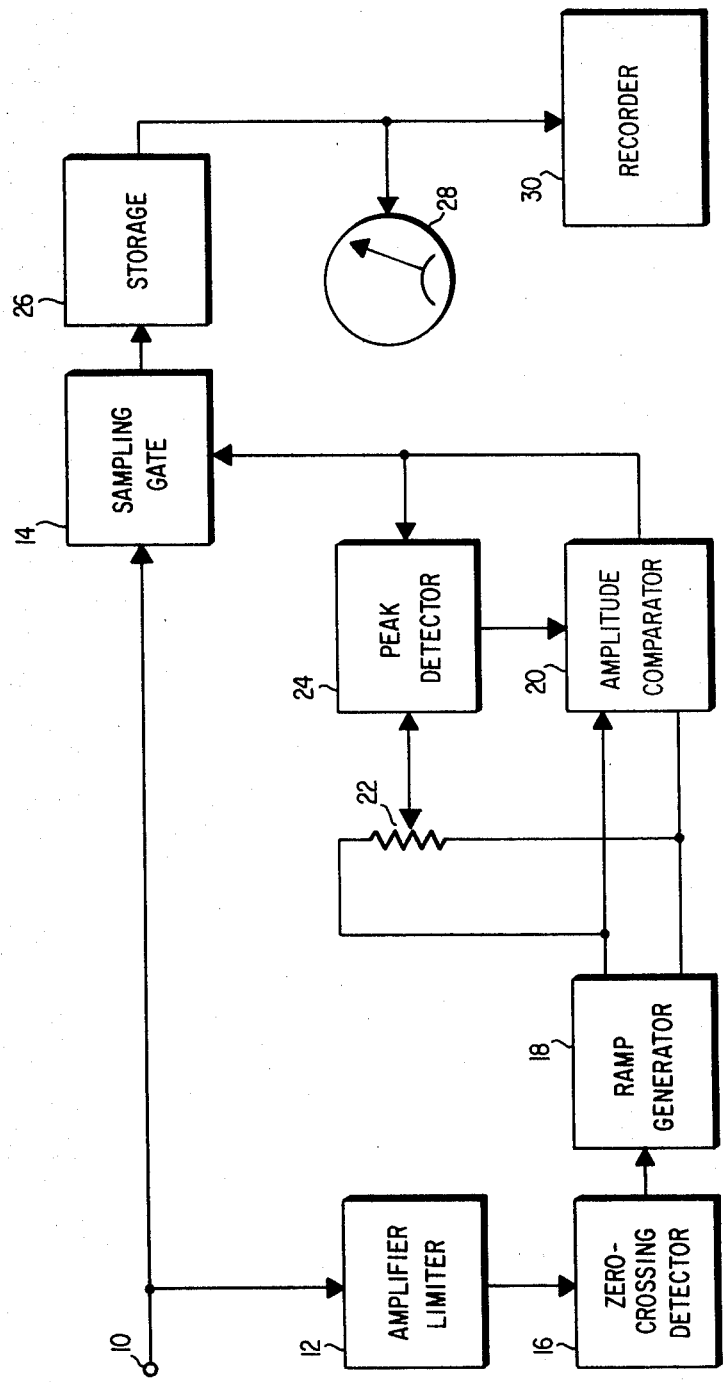
INVENTOR
ROBERT HENRY McCRACKEN
ATTORNEYS

PHASE-SAMPLING VOLTMETER

BACKGROUND OF THE INVENTION

This invention relates generally to devices for measuring electrical voltages and more particularly to a voltmeter for repetitively sampling an input signal at a selectable phase so that an amplitude measurement of the same at the selected phase may be continuously obtained.

It is frequently desired to know the amplitude of a recurrent waveform at a particular phase. In the past the amplitude of a recurrent waveform could be obtained by measuring an oscilloscopic display of the waveform. While somewhat satisfactory, the oscilloscopic-type displays were useful only when a stable display could be obtained, a static measurement was needed and no output signal function needed to be derived from the measured value. Moreover, the oscilloscopic-type display included complex electrical circuitry and was thereby relatively expensive and because of the size occupied a great deal of space.

SUMMARY OF THE INVENTION

Accordingly, it is an object of the subject invention to provide a unique phase-sampling voltmeter.

Another object of this invention is to provide a new and improved voltmeter for continuously indicating the amplitude of a repetitive waveform at any predetermined phase.

Still another object of the present invention is to provide a new and improved phase-sampling voltmeter which is easy to construct, occupies a small amount of space and is relatively inexpensive.

A further object of the instant invention is the provision of a new and improved phase-sampling voltmeter which will provide a continuous indication and a simultaneous electrical output of an input signal at a continuously selectable phase regardless of changes in either frequency, amplitude or waveform shape of the input signal.

One other object of this invention is to provide a new and improved phase-sampling voltmeter which may be used in conjunction with a recording device to provide a permanent record of the amplitude of a recurrent waveform at a particular phase.

Briefly, in accordance with a preferred embodiment of this invention these and other objects are in one aspect attained by the provision of apparatus for indicating the amplitude of a recurrent waveform at any selectable phase by the use of a synchronized ramp voltage which at a proper time triggers a comparator device, the output of which enables a sampling gate to sample the input signal so that the same may be either continuously indicated or recorded at the desired phase.

BRIEF DESCRIPTION OF THE DRAWING

A more complete appreciation of the invention and many of the attendant advantages thereof will become readily apparent as the same becomes better understood by reference to the following detailed description when considered in connection with the accompanying solitary view which illustrates a block diagram of the phase-sampling voltmeter according to the present invention.

DETAILED DESCRIPTION OF THE PREFERRED EMBODIMENT

Referring now to the drawings, an input signal whose amplitude is to be continuously sampled at a particular phase is received at an input terminal 10 and the same is simultaneously applied to a conventional amplifier and limiting device 12 and to a conventional sampling gate 14. The sampling gate 14 will allow a sample of the input signal to pass therethrough when enabled by a pulse or the like. It should be understood that the input signal applied at input terminal 10 will generally be of a recurrent type though the frequency, amplitude, and waveform shape may continuously change on a cycle-to-cycle basis. After the input signal has been properly amplified and shaped by amplifier limiter 12, the same is applied to a conventional zero-crossing detector 16 which is used to synchronize a conventional ramp generator 18 so that the signal generated therefrom will always begin at the start of a new cycle of the input signal. The output from the ramp generator 18 is applied as one input to a conventional amplitude comparator 20. A desired phase selection may be obtained by the use of a potentiometer 22 which may be variably adjusted to select a fraction of the ramp voltage equal to the fraction of the waveform cycle which represents the desired phase. The selected fractional ramp is then peak detected by a conventional peak detector 24, which may be for example a capacitor and diode arrangement, and provided as a reference voltage to the other input of the amplitude comparator 20. When the unattenuated ramp signal from the ramp generator 18 reaches the amplitude of the reference signal provided by the peak detector 24, the amplitude comparator will emit a pulse. It should be apparent that this pulse will be emitted at the point of time when the input signal is at the particular selected phase of interest. It should also be apparent that such a pulse will be emitted for each recurrent waveform cycle. Any pulse emitted from the amplitude comparator 20 will simultaneously reset the peak detector 24 and also enable the sampling gate 14 whereby a sample of the input signal at the desired phase is allowed to be stored in a conventional storage device 26, such for example as a capacitor. The signal stored may then be immediately observed upon an indicating device 28 on a cycle-to-cycle basis or the same may be continuously recorded on a conventional recorder 30, such for example as a conventional X-Y plotter.

It should bow be apparent that the apparatus of the herein described invention allows for the continuous indication of the amplitude of a recurrent waveform at any selectable phase. Obviously, numerous modifications and variations of the present invention are possible in light of the above teachings. For example, phase sampling of a waveform in accordance with the subject invention could be used in a time-multiplex communication system to allow many channels of modulation to be transmitted on a single carrier with the phase-sampling voltmeter of the subject invention being used both for coding and decoding purposes. Moreover, if a complex waveform contains amplitude messages at various phases, these may be independently recovered by setting the phase potentiometers of several receivers, each using the voltmeter of the subject invention, to an appropriate phase position. Furthermore, the phase-sampling voltmeter of the subject invention could be used to strobe a high frequency signal to reproduce the same at a lower frequency by sampling the waveform as the phase setting potentiometer is rotated through a 360° cycle. The desired rate of rotation would be set in accordance with the frequency desired and could be obtained by use of a synchronous motor or the like. An output X-Y plotter could then be used to record the frequency translated waveform.

I therefore, wish it to be understood that I do not desire to be limited to the exact details of construction shown and described for obvious modifications will occur to a person skilled in the art.

What is claimed as new and desired to be secured by a Letters Patent of the United States is:

1. A phase-sampling voltmeter for sequentially sampling the amplitude of successive cycles of a recurrent waveform at a selectable phase and for providing an output therefrom comprising:
   a ramp generator synchronized with the recurrent waveform for providing a ramp voltage signal,
   a peak detector,
   a variable resistance means connecting the output of the ramp generator to the input of the peak detector, said variable resistance means providing an attenuated ramp signal to the peak detector, said attenuated ramp signal having a peak value indicative of said selected phase, said peak detector having capability to store said peak value and provide the same as a reference signal for comparison with a ramp signal during a succeeding time period, an amplitude comparator having said reference signal provided by said peak detector as a first input thereto and said ramp voltage signal provided by said ramp generator as the second input thereto, said comparator generating an output signal when said ramp generator voltage signal reaches a level equal to that of said reference signal, a sampling gate responsive to said output signal from said amplitude comparator for allowing a sample of said recurrent waveform to pass therethrough, and, means connectable to the output of said sampling gate for indicating the amplitude of said sample.

2. A phase-sampling voltmeter as in claim 1 wherein said ramp generator is synchronized by use of a zero-crossing detector which restarts said ramp signal each time a zero-crossing of said recurrent waveform occurs.

3. A phase-sampling voltmeter as in claim 2 which further includes a storage means connected to the output of said sampling gate for storing the most recent sample.

4. A phase-sampling voltmeter as in claim 3 wherein the output from said amplitude comparator will simultaneously enable said sampling gate and reset said peak detector.

5. A phase-sampling voltmeter as in claim 4 wherein the output of said storage means is connected to a recorder whereby a permanent history of samplings of said recurrent waveform may be made.